United States Patent

Mazzucato et al.

[15] 3,645,766

[45] Feb. 29, 1972

[54] METHOD FOR DRYING AND STORING DRY FLOWERS AND LEAVES

[72] Inventors: Pietro Mazzucato; Gino Mazzucato, both of Via S. Fermo 5, Padova, Italy

[22] Filed: Apr. 16, 1969

[21] Appl. No.: 816,821

[30] Foreign Application Priority Data

Apr. 17, 1968 Italy ................................. 31819 A/68
Nov. 22, 1968 Italy ................................. 31878 A/68

[52] U.S. Cl. .............................................................. 117/3
[51] Int. Cl. ......................................................... A01n 3/02
[58] Field of Search ..................................... 117/3.0

[56] References Cited

UNITED STATES PATENTS

| 89,515 | 4/1869 | Stigale | 117/3 X |
| 1,446,790 | 2/1923 | Ellison | 117/3 |
| 2,502,592 | 4/1950 | Rieke | 117/3 UX |
| 2,567,929 | 9/1951 | Fessenden | 117/3 |
| 3,000,753 | 9/1961 | Rockland | 117/3 X |
| 3,212,912 | 10/1965 | Jones | 117/3 |

OTHER PUBLICATIONS

W. E. Groves, " Paraffin Wax," Oct. 1928 Florists Exchange, p. 709.

*Primary Examiner*—William D. Martin
*Assistant Examiner*—Harry J. Gwinnell
*Attorney*—Young & Thompson

[57] ABSTRACT

A drying and storing method, particularly fitted for flowers and leaves, wherein the vegetables are delicately immersed in a suitably heated powder material having a high absorbing power, so that dehydration process gradually occurs in the absence of light and active atmosphere gases, whereupon the dried flower is preheated to paraffin melting temperature and immersed for a few minutes in a melted paraffin or wax bath, then removed and cooled down to room temperature.

1 Claim, No Drawings

METHOD FOR DRYING AND STORING DRY FLOWERS AND LEAVES

In these last years, dry flowers and leaves, which keep for a long period, have been particularly used in decoration.

Heretofore, flower and leaf drying was effected by certain methods having the drawback of deforming the flower or altering its color, and lending themselves only to some types of vegetables.

Let us consider, for example, the drying being obtained by pressing a flower between two sheets of blotting paper, or exposing it to heat.

The method according to the present invention enables any flower to be dried, while maintaining unaltered the color and shape thereof.

This is made possible by causing the dehydration process for the vegetable tissues to gradually occur in the absence of light and in an environment free from active gases, entrapping the flower within an occluding mass preventing the deformation thereof.

The method consists of dehydrating by contacting the articles with organic or inorganic powder materials having a high absorbing power, such as silica gel, alumina, alkaline-earth sulphates and carbonates, talc, cereal and tuber flours, etc. The powder material should be properly heated so that the dehydration process is completed prior to vegetable tissue decomposition arising.

Thus, the flowers are dehydrated by water transfer to the powder material to reach a water balance between the powder material and cytoplasm substance in the vegetable tissue sufficient to impart dryness to the flower.

On the other hand, a flower is incapable of substantially changing the shape thereof during the process since the various parts thereof are restrained by the powder material, or changing the color as any photosynthesis and oxidizing process is prevented in that such a flower is isolated from light and active atmosphere gases.

The flowers, thus dehydrated and dried, have to be stored in an anydrous environment in order not to be damaged by air moisture causing curling up thereof and impairing the attractiveness thereof.

To avoid the above drawback and to extend indefinitely the life of a dry flower, on all the parts of the dry flower there should be applied a very thin paraffin or wax film layer so as to be perfectly transparent. Obviously, the paraffin or wax operates to bar any contact with environment moisture by completely sheathing the flower.

The coating can be achieved by dipping a previously dried flower in a melted paraffin or wax bath. Such additives as paraffin oil, stearin and the like are generally added thereto for fluidizing thereof and aiding therefore in complete flower covering.

To avoid an irreparable damage in the flower due to abrupt change in temperature when being immersed, the flower is subjected to gradual preheating in an oven so as to be brought to a temperature substantially close to that of the melted paraffin.

When removed from the bath and allowed to cool down, the flower is unaltered, having retained the original shape and colors.

As will be apparent, the above described method can be applied also to dry leaves or branches.

EXPLANATORY EXAMPLES FOR THE DEHYDRATING METHOD

The method is the same and the means being used are also the same as to amount and quality for the various types of flowers. The only possible difference is the position of the flower in the pot where the process is carried out.

1. System with the flower in a vertical attitude with the petals up: having sheared a dahlia, the latter is introduced into a porous reservoir, on which a layer of some centimeters of corn flour having a water content not exceeding 6–7 percent was formed.

The flower is then completely covered with the same material in a layer at least 2 cm. higher than the flower end. The amount of flour being used will vary in accordance with the pot capacity and diameter of the flower corolla: ordinarily, for a flower having an 8 cm. corolla, an amount of about 500 g. corn flour is used.

The flower is deposited in the reservoir which shall be placed in an environment having a temperature of 40°–50° C. for five days. Thereafter, the flower will have undergone the drying process. Upon flour removal from the pot, the flower will be unchanged in colors and shape.

The above disclosure is applicable without any distinction to other types of flowers, such as anemone, delphinium, coreopis and the like.

2. The same result is attained also by placing the sheared flower in a pot with the petals down.

The time changes are related to the temperature of the material first used for drying.

For example, should the temperature for the sand or flour being used be about 45°–50° C. for all the required time period, 3 days would be enough to achieve the desired drying.

3. Following drying, to ensure flower durability and preservation thereof from moisture, the flower has to be protected by isolating it from air.

To this end, the flower has to be heated to a temperature of 60° C., or other melting temperature of the wax or paraffin in which the flower is to be immersed.

The flower being heated on the one hand and the wax or paraffin being melted on the other hand, the flower is immersed as heated in the latter for a period of only few seconds e.g., about 3–5 seconds, and then is cooled to cause the wax to solidify as fast as possible; normal room temperature will suffice.

What is claimed is:

1. A method of preserving flowers, comprising immersing said flowers in a powdery material having a high power to absorb water, at a temperature of about 40° to 50° C. for about 3 to 5 days, thereby to dehydrate said flowers in the absence of light and in an environment free of active atmosphere gases, thereafter gradually increasing the temperature of the dehydrated flowers to about 60° C., and immersing the heated flowers in melted wax or paraffin while the flowers are at a temperature substantially close to that of the melted wax or paraffin for about 3 to 5 seconds.

* * * * *